United States Patent
Hayashi et al.

[11] Patent Number: 6,096,395
[45] Date of Patent: Aug. 1, 2000

[54] ROLL INCLUDING FOAM BODY AND METHOD OF PRODUCING THE ROLL

[75] Inventors: Saburo Hayashi, Kasugai; Sumio Oinuma, Tajimi; Takafumi Yamamoto, Kasugai; Kazutoshi Soumiya, Komaki; Hiroyasu Kato, Bisai, all of Japan

[73] Assignee: Tokai Rubber Industries, Ltd., Japan

[21] Appl. No.: 08/149,815

[22] Filed: Nov. 10, 1993

[30] Foreign Application Priority Data

| Dec. 16, 1992 | [JP] | Japan | 4-354597 |
| Jun. 24, 1993 | [JP] | Japan | 5-180620 |
| Jun. 24, 1993 | [JP] | Japan | 5-180621 |

[51] Int. Cl.$^7$ .................................................. B32B 1/08
[52] U.S. Cl. ...................... 428/35.9; 355/274; 428/36.8; 428/36.91; 428/304.4
[58] Field of Search ................ 428/304.4, 36.8, 428/35.8, 35.9, 36.9, 36.91; 355/274

[56] References Cited

U.S. PATENT DOCUMENTS

| 3,942,888 | 3/1976 | Maksymiak et al. | 355/277 |
| 4,666,780 | 5/1987 | Krum | 428/418 |
| 4,807,341 | 2/1989 | Nielsen et al. | 492/56 |
| 4,956,211 | 9/1990 | Saito . | |
| 4,967,231 | 10/1990 | Hosoya et al. | 355/219 |
| 5,075,189 | 12/1991 | Ichino et al. | 430/59 |
| 5,102,741 | 4/1992 | Miyabayashi | 428/447 |
| 5,103,262 | 4/1992 | Yamazaki | 355/211 |
| 5,168,313 | 12/1992 | Hosaka et al. | 355/274 |
| 5,312,662 | 5/1994 | Ohta et al. | 428/36.8 |
| 5,324,885 | 6/1994 | Koga et al. | 118/657 |

FOREIGN PATENT DOCUMENTS

| 0210871 | 2/1987 | European Pat. Off. . |
| 0323252 | 7/1989 | European Pat. Off. . |
| 0329366 | 8/1989 | European Pat. Off. . |
| 0554114 | 8/1993 | European Pat. Off. . |

OTHER PUBLICATIONS

Database WPI, Week 9038, Derwent Publications Ltd., London, DB; AN 90–286911 & JP–A–2 202 430 (Tokai Rubber) Aug. 10, 1992.
Patent Abstracts of Japan, vol. 16, No. 556 (C–1007) Nov. 26, 1992 & JP–A–04 216 834 (Bridgestone) Aug. 6, 1992.
Patent Abstracts of Japan, vol. 16, No. 424 (P–1415) Sep. 7, 1992 & JP–A–04 143 769 (Seiko Epson) May 18, 1992.

*Primary Examiner*—Blaine Copenheaver
*Attorney, Agent, or Firm*—Parkhurst & Wendel, L.L.P.

[57] ABSTRACT

A charging roll including a center shaft, a foam layer formed on an outer circumferential surface of the center shaft, an electrically conductive elastic layer formed on an outer surface of the foam layer, and a resistance adjusting layer and a protective layer formed by coating on an outer surface of the electrically conductive elastic layer. The foam layer is an electrically conductive foam body or a foam body a part of which is made electrically conductive. A method of producing a composite roll, such as the above charging roll, which includes a foam layer formed on a shaft, and a solid elastic layer formed on the foam layer, includes the step of forming multiple minute grooves in an outer circumferential surface of a pre-foam tube which gives the foam layer, or an inner circumferential surface of an elastic tube which gives the solid elastic layer.

8 Claims, 5 Drawing Sheets

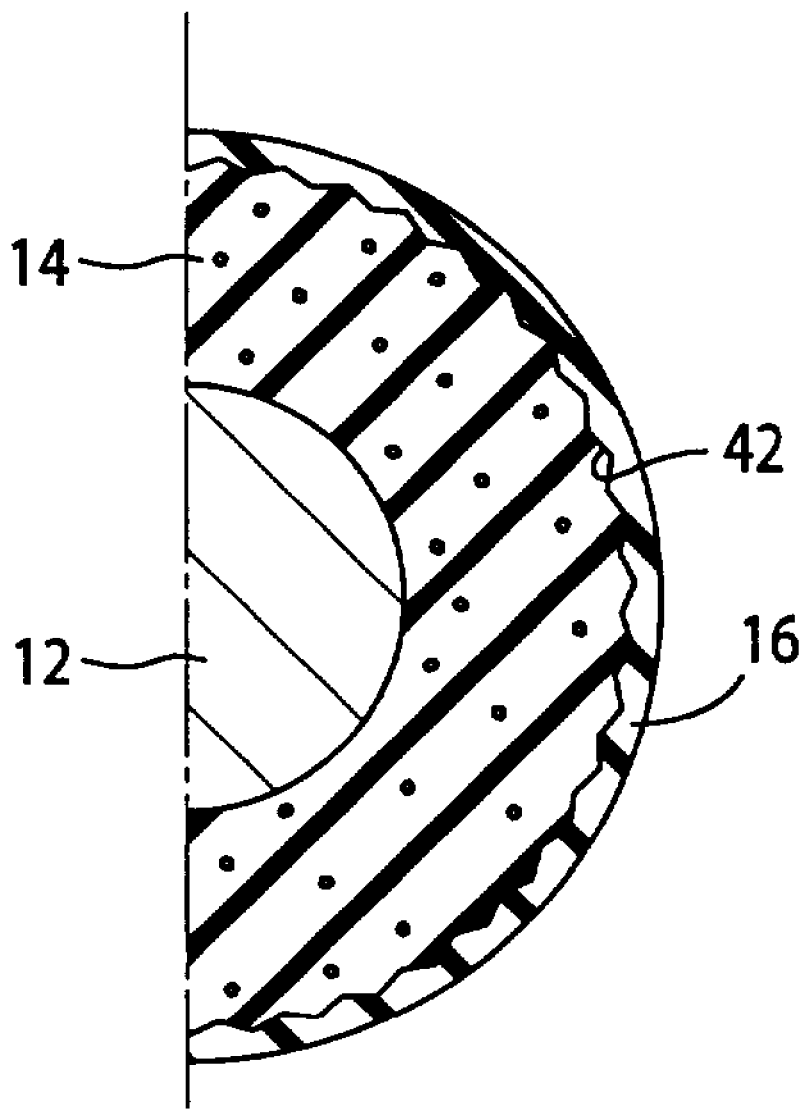

ROLL INCLUDING FOAM BODY AND METHOD OF PRODUCING THE ROLL

BACKGROUND OF THE INVENTION

1. Field of the Invention

The present invention relates to a roll, such as a charging roll, image developing roll, image transfer roll, cleaning roll, pressure roll, and the like for use in electrophotographic copying machines, printers or the like, and particularly to a charging roll. This invention also relates to a method of producing such a roll as indicated above.

2. Discussion of the Related Art

In conventional electrophotographic copying machines or printers, a corona discharge device has been used for electrostatically charging a surface of a photosensitive body or drum so that the surface is uniformly provided with a predetermined electric potential. However, use of the corona discharge device results in some problems, such as (1) the necessity of high-voltage power supply, (2) relatively low charging efficiency, (3) the occurrence of a high level of ozone, and (4) local variation in the degree of charging of the photosensitive drum due to contamination of wires. In recent years, therefore, there have been developed contact type charging methods, in particular, a roll charging method which uses an electrically conductive roll as a charging roll.

In this roll charging method, the charging roll is rotated with a photosensitive drum which is positively moved or driven by a suitable drive device, with the surface of the roll being in pressed contact with that of the drum. When a given voltage is applied to a center shaft or core of the charging roll, electrical charges are directly given to the surface of the photosensitive drum, whereby the drum surface is charged with a predetermined electrical potential. If the applied voltage consists solely of a DC component, microscopic variation arises in contact between the charging roll and the photosensitive body, which results in spot-like charging variation. As a solution to this problem, a voltage consisting of a DC component and an AC component superimposed on the DC component is applied to the charging roll. The frequency of the AC electric field is determined depending upon a process speed, that is, the frequency increases with an increase in the process speed. In other words, the AC component of the voltage has a low frequency when the processing is effected at a low speed, and has a high frequency when the processing is effected at a high speed.

The construction of the charging roll used in the above-described charging method is generally shown in FIG. 3, by way of example. As shown in FIG. 3, an electrically conductive elastic layer 4 formed of a low-hardness electrically conductive rubber composition is formed on an outer circumferential surface of a center shaft or core 2. on an outer circumferential surface of the conductive elastic layer 4, there are formed in lamination a preventive layer 6, a resistance adjusting layer 8 and a protective layer 10 in the order of description. The preventive layer 6 serves to prevent a softening agent from oozing or migrating out of the conductive elastic layer 4.

When a voltage is applied to the above-described charging roll with its surface being in pressed contact with the photosensitive drum, the AC component of the voltage causes force to act between the drum and the charging roll, which force depends an the frequency of the AC component. Consequently, the photosensitive drum, which has a thin metallic pipe as a base or core member, vibrates and generates noise. Such vibration and noise are conventionally prevented by various damping methods, such as coating the inner surface of the photosensitive drum with a damping coating, or filling the inside of the drum with a damping material. Otherwise, a noise insulating device is needed for reducing sound or noise which leaks from a housing accommodating the photosensitive drum and charging roll.

Since the opposite ends of the center shaft 2 of the charging roll are pressed against the photosensitive drum by means of springs or the like, the width of the nip between the drum and roll is likely to be small at the opposite ends of the roll and to be large at a middle portion of the roll. With this difference in the nip width between the photosensitive drum and charging roll, a clearance tends to be formed between the middle portion of the roll and the drum, thereby causing the photosensitive drum to be non-uniformly or unevenly charged.

In view of the above, there is recently proposed a a charging roll which is constructed such that a foam layer consisting of an electrically conductive foam body is formed on the outer circumference of the center shaft, and such that a resistance adjusting layer and a protective layer are formed by coating on the outer circumference of the foam layer. The hardness of the roll can be lowered due to the use of the electrically conductive foam body, in order to effectively reduce the noise as described above.

For the above-described charging roll to offer a sufficiently high noise reducing effect, the expansion ratio of the conductive foam body must be increased so as to reduce the hardness of the roll to a sufficiently low level. Consequently, the foam body may likely suffer from cell defects. If the charging roll employs the foam body having such a low hardness, creases are likely to appear on the roll surface due to shrinking of the coating layers (resistance adjusting layer and protective layer), thus making it difficult to provide a smooth or even roll surface. If the smoothness or evenness of the toll surface is unsatisfactory, the use of such charging roll may result in producing a poor or deficient image.

Further, since the foam layer has relatively large variation in its dimensions, the outer circumferential surface of the foam layer needs to be ground prior to coating thereof, so that the outside diameter of the charging roll is made unvaried or constant, and is accurately controlled to within a desired range. Moreover, since the inside diameter of the foam body formed in a cylindrical shape varies from portion to portion, that is, the inner circumferential surface of the foam body has poor smoothness, the inner surface needs to be also ground before the shaft is inserted into the cylindrical foam body.

SUMMARY OF THE INVENTION

The present invention has been developed in the light of the above situations. It is therefore a first object of the invention to provide a charging roll which meets required electrical properties and maintains a smooth surface, and which causes reduced vibrational noise due to an AC component of a voltage applied thereto, and stably assures a constant nip, when the roll is in pressed contact with a photosensitive drum. It is a second object of the invention to provide a method of producing a roll, such as the charging roll an described just above.

The first object may be attained according to one aspect of the present invention, which provides a charging roll comprising: a center shaft; a foam layer formed on an outer circumferential surface of the center shaft, the foam layer consisting of an electrically conductive foam body or a foam body a part of which is made electrically conductive; an electrically conductive elastic layer formed on an outer surface of the foam layer; and a resistance adjusting layer and a protective layer formed by coating on an outer surface of the electrically conductive elastic layer.

The electrically conductive elastic layer may be formed of one of an electrically conductive rubber composition and an electrically conductive thermoplastic elastomer, and preferably has a thickness of 100 $\mu$m~1200 $\mu$m.

In the charging roll constructed according to the present invention, the electrically conductive elastic layer (non-foamed or solid layer) is formed on the outer surface of the foam layer, so as to cover and eliminate cell defects of the foam layer. Consequently, the roll surface is not affected by the cell defects, and can be made as smooth as a surface of a solid rubber body. Since coating layers (the resistance adjusting layer and protective layer) are formed on the outer surface of the conductive elastic layer, which is as smooth as that of the solid rubber body, creases are less likely to appear on the coating layers upon drying and heat treatment thereof, as compared with the case where the coating layers are directly formed on the foam layer. Thus, the charging roll exhibits a considerably improved surface smoothness or evenness, and thus favorably prevents toner from accumulating thereon, assuring significantly enhanced reliability in terms of the quality of images produced. Further, since the dimensional accuracy of the conductive elastic layer (solid) is sufficiently high, there is no need to grind the surface of the elastic layer to achieve a desired outside diameter of the roll with high accuracy.

If the thickness of the electrically conductive elastic layer is sufficiently reduced such that the foam layer constitutes a major part of a base roll body which consists of the foam layer and conductive elastic layer, the hardness of the present charging roll can be significantly lowered, assuring a sufficiently high noise reducing effect as offered by a low-hardness foam body. This eliminates a need to provide a device for preventing noise or a sound-proof device on a photosensitive drum of a copying machine or printer, or on a housing thereof.

When the present charging roll is held in pressed contact with the photosensitive drum, the roll as a whole acts like a low-hardness foam body, due to reduction of the volume of the foam layer upon its compression, and makes a uniform contact with the drum, assuring a stable or constant nip between the roll and the drum. Accordingly, it is possible to uniformly charge the photosensitive drum, and prevent toner from accumulating on the roll, thus assuring an improved quality of images with high reliability.

When the electrically conductive elastic layer is formed of a conductive rubber composition or a conductive thermoplastic elastomer, with a thickness of 100 $\mu$m to 1200 $\mu$m, the present charging roll advantageously yields all of the above-described effects.

The above-described second object of the present invention may be accomplished according to another aspect of the invention, which provides a method of producing a composite roll having a foam layer formed on an outer surface of a shaft, and a solid elastic layer formed on an outer surface of the foam layer, comprising the steps of: (a) forming a multiplicity of minute grooves in an outer circumferential surface of a pre-foam tube which gives the foam layer, such that the minute grooves extend in an axial direction of the tube, and locating the pre-foam tube radially outwardly of the shaft; (b) locating an elastic tube which gives the solid elastic layer, radially outwardly of the pre-foam tube; (c) positioning the shaft, the pre-foam tube and the elastic tube within a cavity of a metallic mold; and (d) affecting a foaming operation for the pre-foam tube, to thereby provide the foam layer, such that the foam layer is formed integrally with the solid elastic layer provided by the elastic tube.

The composite roll having the foam layer and solid elastic layer may suffer from voids which appear between the two layers due to air trapped in the roll upon foaming of the pre-foam tube. The air remains in the roll since the degree of foaming of the pre-foam tube varies from portion to portion, and a portion of the tube which has initially foamed prevents air from escaping when another portion foams. According to the above-described method of the invention, the multiplicity of the minute grooves are formed in the outer circumferential surface of the pre-foam tube that gives the foam layer, such that the grooves extend in the axial direction of the tube, preferably over the entire axial length thereof. Upon foaming of the pre-foam tube, therefore, air can effectively escape through the axial grooves, from the middle portion to the axial end portions of the roll, before the foam body is completely adhered to the inner surface of the elastic tube. Accordingly, the air can be effectively removed from the interface between the foam layer and the solid elastic layer, thus avoiding the occurrence of the voids as described above, and assuring significantly improved surface smoothness of the composite roll.

The above-described second object of the present invention may be also accomplished according to a further aspect of the invention, which provides a method of producing a composite roll having a foam layer formed on an outer surface of a shaft, and a solid elastic layer formed on an outer surface of the foam layer, comprising the steps of: (a) locating a pre-foam tube which gives the foam layer, radially outwardly of the shaft; (b) forming a multiplicity of minute grooves in an inner circumferential surface of an elastic tube which gives the solid elastic layer, such that the minute grooves extend in an axial direction of the elastic tube, and such that the inner circumferential surface has a surface roughness (Rz) of not less than 15 $\mu$m; (c) locating the elastic tube radially outwardly of the pre-foam tube; (d) positioning the shaft, the pre-foam tube and the elastic tube within a cavity of a metallic mold; and (e) effecting a foaming operation for the pre-foam tube, to thereby provide the foam layer, such that the foam layer is formed integrally with the solid elastic layer provided by the elastic tube.

According to the present method of producing the composite roll, the multiplicity of the minute grooves are formed in the inner circumferential surface of the elastic tube that gives the solid elastic layer, such that the grooves extend in the axial direction of the tube, preferably over the entire axial length thereof, and such that the inner circumferential surface of the elastic tube has a surface roughness: Rz of not less than 15 µm. Upon foaming of the pre-foam tube, therefore, air can effectively escape through the axial grooves, from the middle portion to the axial end portions of the roll, before the foam body is completely adhered to the inner surface of the elastic tube. Accordingly, the air can be effectively removed from the interface between the foam layer and solid elastic layer of the roll, thus avoiding the occurrence of the voids as described above, and assuring significantly improved surface smoothness of the composite roll.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which:

FIG. 10 is a transverse cross sectional view showing the composite roll obtained according to a second preferred method of the invention.

DETAILED DESCRIPTION OF THE PREFERRED EMBODIMENTS

Figure 1:
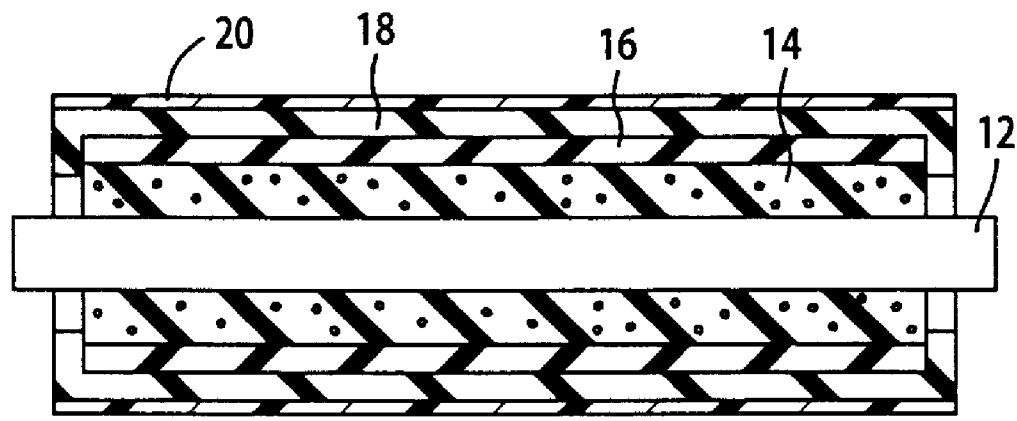
FIG. 1 is an axial cross sectional view showing one embodiment of a charging roll of the present invention.

Referring first to FIG. 1 showing one embodiment of a charging roll of the present invention, a foam layer 14 consisting of an electrically conductive foam body is formed on an outer circumferential surface of a center shaft (core) 12, and an electrically conductive elastic layer 16 is formed on an outer circumferential surface of the foam layer 14.

Further, a resistance adjusting layer 18 and a protective layer 20 are formed by coating on a base roll body which consists of the foam layer 14 and conductive elastic layer 16.

The foam layer 14 is formed of any one of various known foam materials which satisfy required characteristics for use in the charging roll and do not suffer from fatigue or other problems. An electrically conductive foam material generally used for the foam layer 14 is prepared by mixing an electrically conductive powder or fiber, such as metal powder, carbon black or carbon fiber, into a rubber foam body, such as urethane foam body or hydrin rubber foam body.

Figure 2:
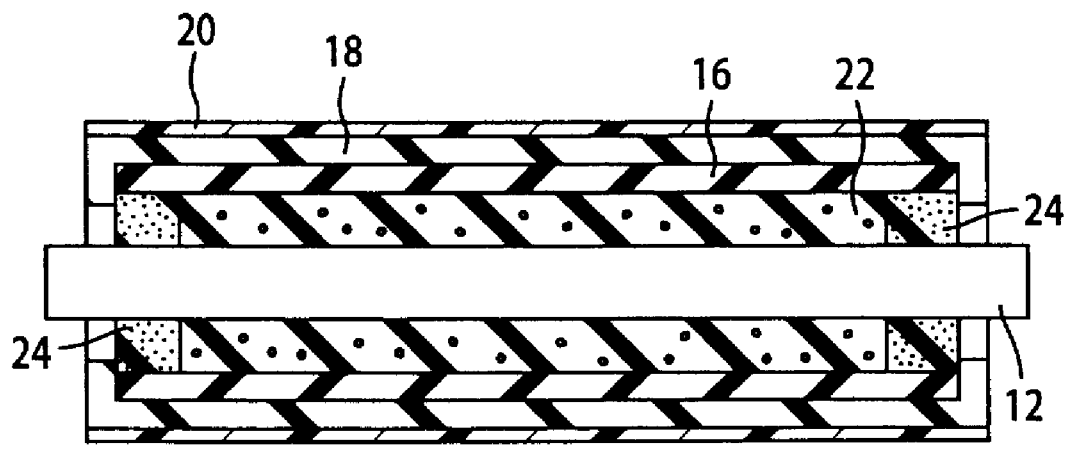
FIG. 2 is an axial cross sectional view showing another embodiment of a charging roll of the invention.
Figure 3:
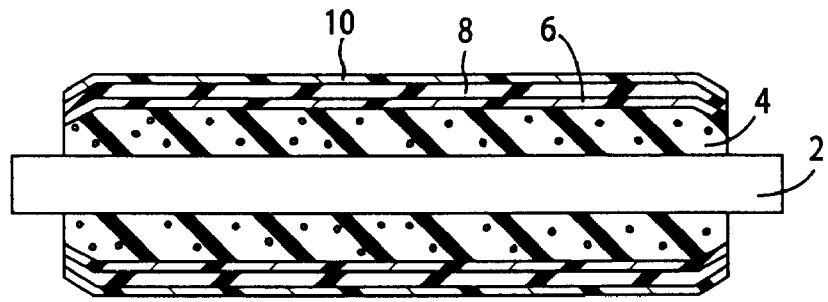
FIG. 3 is an axial cross sectional view showing a conventional charging roll.

The foam layer 14 may be formed of an insulating material or a partially conductive material provided the center shaft 12 is electrically connected to the conductive elastic layer 16. FIG. 2 shows an example of a charging roll in which a foam layer 22 is formed of an insulating foam material, and includes axially opposite end portions 24, 24 which are made electrically conductive. For instance, the foam layer 22 is formed by impregnating the end portions 24 with a liquid including an electrically conductive powder or fiber, such as carbon black or carbon fiber, dispersed in water, and then drying the impregnated end portions 24.

The lower the hardness (Hs) of the foam body (22) is, the more effectively the foam body reduces noise. Therefore, the expansion ratio and other factors of the foam body are desirably adjusted so that the foam body has a Shore A hardness of not greater than 15, and thus provides a sufficiently high noise reducing effect.

The material used for the conductive elastic layer 16 may be optimally selected from electrically conductive rubber compositions or conductive thermoplastic elastomers, which contain conductive powder or fiber, such as metal powder, carbon black or carbon fiber. The elastic layer 16 may also be formed of a hard resin if the layer 16 has such a small thickness as to be easily elastically deformed. In this case, however, it becomes difficult to ensure a sufficiently large contact area or width between the charging roll and the photosensitive drum, since even a relatively thin layer of the hard resin increases the hardness of the roll. The use of the hard resin is also disadvantageous since the thickness of the hard resin layer must be reduced to be as small as about 50 µm, making it difficult to form and handle the layer, or causing breakage or other problems.

The thickness of the conductive elastic layer 16 as described above is desirably held in a range of 100 µm to 1200 µm. If the thickness of the elastic layer 16 is smaller than 100 µm, the elastic layer 16 is not able to sufficiently cover and eliminate cell defects of the foam layer 14, 22. As a result, recesses and the like tend to appear on the elastic layer 16 at its portions corresponding to the cell defects, resulting in poor smoothness of the surface of the roll. If the thickness of the elastic layer 16 exceeds 1200 µm, the effect of the foam layer 14, 22 for reducing noise is deteriorated.

To form the foam layer 14, 22 and conductive elastic layer 16 integrally on the center shaft 12, the shaft 12 is disposed at the center of a cylindrical metallic mold, and a relatively thin tube made of an electrically conductive elastic material, which gives the conductive elastic layer 16, is disposed coaxially with the center shaft 12. Then, a molding material which gives the foam body 14, 22 is injected under pressure into a cylindrical space between the shaft 12 and the elastic layer 16, and a foaming operation is effected to form the foam body 14, 22.

The foam layer 14, 22 and conductive elastic layer 16, and the foam layer 14, 22 and center shaft 12 are fixed to each other with sufficiently high durability, only due to the pressure of the foam body 14, 22, without using an adhesive. However, the foam layer 14, 22 may be bonded to the elastic layer 14 and the shaft 12 as needed, by means of a suitable adhesive, without affecting the effect of the present invention.

When the resistance adjusting layer 18 is formed by coating on the outer surface of the conductive elastic layer 16, the elastic layer 16 may be swollen with a solvent of a coating liquid which provides the resistance adjusting layer 18. To avoid this, it is desirable to coat the conductive elastic layer 16 with an electrically conductive resin layer which is not swollen with the solvent, and then coat the resin layer with the resistance adjusting layer 18. The conductive resin layer has a thickness of several microns, and may be formed of a material having as a major component a nylon-based polymer or modified nylon, such as N-methoxymethylated nylon.

The resistance adjusting layer 18 is preferably formed of a rubber containing epichlorohydrin, for example, and is formed by a known coating method, such as dipping. The thickness of this layer 18 is generally held in a range of about 50~500 μm, preferably, about 80~160 μm. Further, the protective layer 20 having a thickness of microns is formed by coating on the outer surface of the resistance adjusting layer 18, so as to prevent the layer 18 from adhering to the photosensitive drum. This protective layer 20 may be formed of a material having as a major component a nylon-based polymer or modified nylon, such as N-methoxymethylated nylon.

Figure 5:
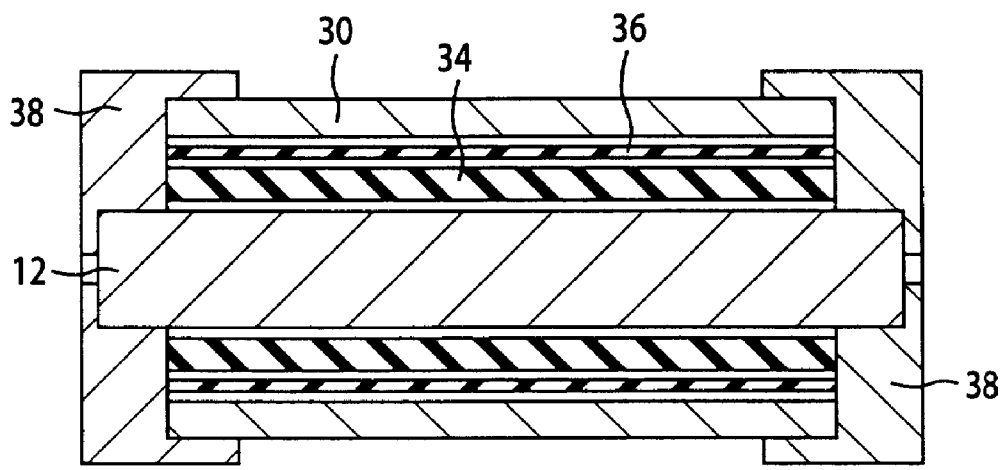
FIG. 5 is an axial cross sectional view showing one process step for forming a composite roll having a foam body and a solid elastic layer, wherein a pre-foam tube giving the foam body and an elastic tube giving the solid elastic layer are positioned in a cylindrical metallic mold.

To assure further improved smoothness of the surface of a roll such as the charging roll as described above, the foam layer 14 and electrically conductive elastic layer 16 are advantageously formed on the center shaft 12, in the manner which will be hereinafter described referring to FIG. 5. Initially, the shaft 12 is disposed at the center of a columnar cavity of a cylindrical metallic mold 30, and a pre-foam tube 34 which gives the foam layer 14 upon its foaming is disposed radially outwardly of the shaft 12. Then, an elastic tube 36 which gives the conductive elastic layer 16 is disposed radially outwardly or the pre-foam tube 34. Thereafter, cap members 38, 38 are fitted on the axially opposite end portions of the metallic mold 30.

The pre-foam tube 34 giving the foam layer 14 is formed of a suitably selected foam material, such as urethane foam, hydrin rubber chloroprene rubber, EPDM and Cl-EPDM. By using the selected foam material, the pre-foam tube 34 is formed by extrusion, for example, with a thickness which is determined depending upon the expansion ratio of the foam material that is related to the volume of the foam layer 14 to be formed. Generally, the pre-foam tube 34 used for the charging roll has a thickness of about 1.5 mm.

On the other hand, the elastic tube 36 which gives the conductive elastic layer 16 of the charging roll, for example, is formed of a known elastic material selected from various rubber compositions, such as EPDM or polyamide elastomer, or thermoplastic elastomers. The elastic tube 34 having a suitable thickness is formed by extrusion, by using the selected elastic material.

Figure 7:
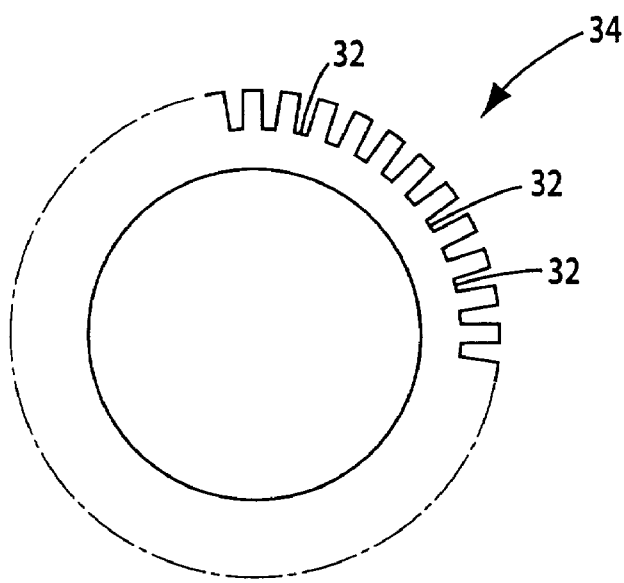
FIG. 7 is an enlarged view showing a part of an end face of the pre-foam tube as shown in FIG. 5.

According to a first preferred method of the present invention, a multiplicity of minute grooves 32 are formed in an outer circumferential surface of the pre-foam tube 34, as shown in FIG. 7, such that the grooves 32 extend in an axial direction of the tube 34, desirably over the entire axial length of the tube 34. These grooves 32 may be formed by a suitable method, such as (1) mechanically processing or machining the outer circumferential surface of the pre-foam tube 14 which has been extruded, so as to provide the surface with the minute grooves 32, or (2) extruding the pre-foam tube 34 from an extrusion die having grooves, so that the extruded tube 34 is formed at its outer circumferential surface with the minute grooves 32. While the minute grooves 32 generally extend in parallel with each other in the axial direction of the pre-foam tube 34 and are arranged over the entire circumference of the tube 34, the grooves 26 may be formed in helical fashion over the outer circumferential surface of the pre-foam tube 34.

Figure 8:
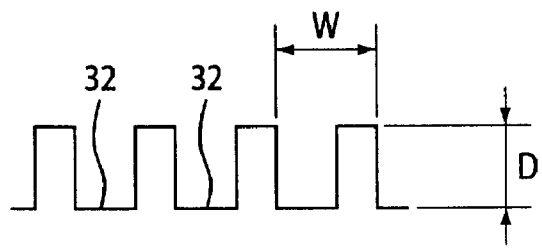
FIG. 8 is a view showing one example of grooves formed in the pre-foam tube as shown in FIG. 5.

To effectively allow air to escape through the grooves 32 during the foaming operation for the pre-foam tube 34, the grooves 32 are arranged in the circumferential direction of the pre-foam tube 32, at a pitch (W) of about 0.1~5 mm, as shown in FIG. 8. This pitch is determined depending upon the outside diameter of the pre-foam tube 34. For example, the pre-foam tube 34 having an outside diameter of about 10 mm and used for forming the charging roll is formed with the grooves 32 that are arranged at a pitch of 0.1~1 mm. If the grooves 32 have an insufficient depth (D), the grooves 32 tend to be closed upon foaming of the pre-foam tube 34, and the air generated during the foaming operation cannot effectively escape through the grooves 32. Accordingly, it is desirable to determine the depth (D) and pitch (W) of the grooves 32 so that the ratio D/W is equal to or greater than 0.3.

Figure 9:
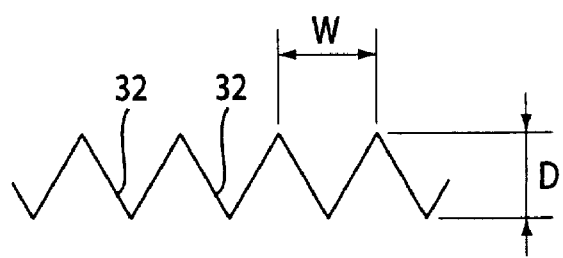
FIG. 9 is a view showing another example of grooves formed in the pre-foam tube as shown in FIG. 5.

It is to be understood that the grooves 32 are not limited to any particular shape, but may be formed in any shape provided the grooves 32 remain for a time long enough to allow air to escape through the grooves 34 during the foaming operation for the pre-foam tube 34. For example, the grooves 32 may have a triangular shape in cross section, as shown in FIG. 9. In this case, too, the above-indicated relationship between the depth (D) and pitch (W) of the grooves 32 should be desirably satisfied.

According to a second preferred method of the present invention, a multiplicity of minute grooves 42 are formed in an inner circumferential surface of the elastic tube 36, such that the grooves 42 extend in an axial direction of the tube 36, desirably over the entire axial length of the tube 36. These grooves 42 may be formed by a suitable method, such as (1) grinding with sandpaper the inner circumferential surface of the elastic tube 36 which has been extruded, in the axial direction of the tube 36, so as to roughen the inner circumferential surface, or (2) extruding the elastic tube 36 from an extrusion die having grooves, so that the extruded tube 36 is provided at its inner circumferential surface with the minute grooves 42. While the minute grooves 42 extend in parallel with each other in the axial direction of the elastic tube 36 and are arranged over the entire circumference of the tube 34, the grooves 42 may be formed in helical fashion over the inner circumferential surface of the elastic tube 36.

To effectively allow air to escape through the grooves 42 during the foaming operation for the pre-foam tube 34, the outer circumferential surface of the elastic tube 36 preferably has a surface roughness: Rz of not less than 15 µm, where Rz represents the ten-point mean roughness, that is, the average value of the absolute values of the heights of five highest profile peaks and the depths of five deepest profile valleys within a sampling length. Since the surface smoothness of the roll is deteriorated if the surface roughness Rz is too high, the surface roughness Rz is generally controlled to be not greater than 50 µm, though the optimum roughness is depending upon the material, thickness and other factors of the elastic tube 36. To enhance the effect of allowing air to escape during the foaming operation, the grooves 42 are arranged in the circumferential direction of the elastic tube 36, preferably at a pitch of about 0.05~1 mm.

Figure 6:
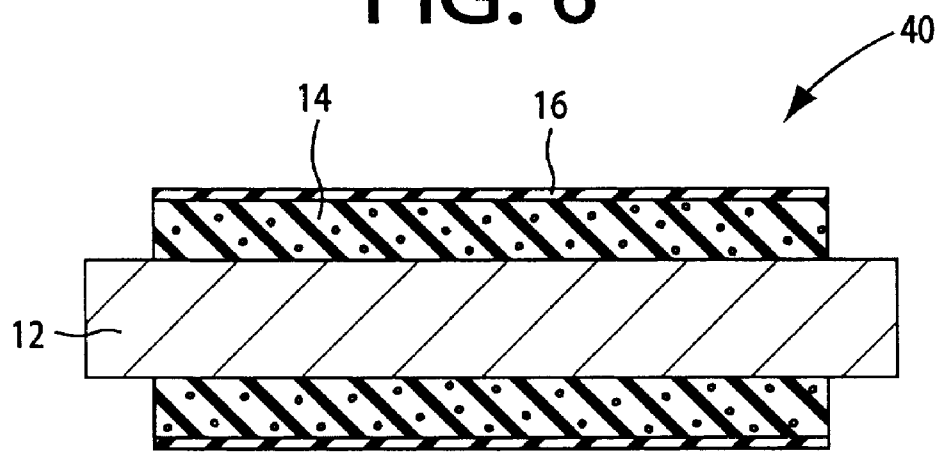
FIG. 6 is an axial cross sectional view showing the composite roll obtained according to a first preferred method of the invention which includes the step of FIG. 5.

After the center shaft 12, pre-foam tube 34 and elastic tube 36 obtained by the first or second preferred method as described above are disposed coaxially with each other within the cavity of the metallic mold 30, in the manner as described above, the pre-foam tube 34 is subjected to a suitable foaming operation, such as heating, so as to provide a composite roll 40 as shown in FIG. 6. The composite roll 40 has the foam layer 14 and electrically conductive elastic layer 16 which are laminated on each other and formed integrally on the center shaft 12.

As described above, according to the first method, air generated during the foaming operation can effectively escape from the axial end portions of the pre-foam tube 34 toward the outside of the roll, through the grooves 32 formed in the outer circumferential surface of the tube 34. According to the second method, such air can effectively escape outwards from the axial end portions of the elastic tube 36, through the grooves 42 formed in the inner circumferential surface of the elastic tube 36. Therefore, the air does not remain in the interior of the roll, thereby favorably avoiding voids which may otherwise appear between the foam layer 14 and elastic layer 16. Consequently, the composite roll 40 exhibits excellent surface smoothness.

It is to be understood that the above-described two preferred methods are not only employed for producing the charging roll constructed according to the present invention, but may be employed for producing any other kind of roll, such as an image developing roll, image transfer roll, cleaning roll or pressure roll, used in electrophotographic copying machines or printers, for example, provided the roll is a composite roll having a foam layer and a solid elastic layer superposed on the foam layer.

EXAMPLES

There will be hereinafter described in detail some examples of charging rolls constructed according to the present invention. However, it is to be understood that the invention is by no means limited to the details of the description of these examples, but may be embodied with various other changes, modifications and improvements, which may occur to those skilled in the art, without departing from the scope of the invention as defined in the appended claims.

Initially, various materials for forming charging rolls were prepared in the manners as described below.

(1) Urethane Foam Body

A polyol mixture was initially prepared by mixing together the following ingredients:

| | |
|---|---|
| polyether polyol ("FA7030" available from Sanyo Chemical Industries, Ltd., Japan) | 100 parts by weight |
| $H_2O$ | 1 part by weight |
| aqueous solution of fatty acid sulfonate ("additive SV" available from Sumitomo Bayer Urethane K.K., Japan) | 1 part by weight |
| silicone foaming agent ("SRX274C" available from Toray Silicone K.K., Japan) | 2 parts by weight |
| triethanolamine | 1.5 parts by weight |
| N,N'-dimethylbenzylamine (catalyst) ("Kaorizer No. 20" available from Kao Corporation, Japan) | 2 parts by weight |
| triethylenediamine (catalyst) ("Dabco33 LV" available from Mitsui Air Products K.K., Japan) | 1 part by weight |

The thus prepared polyol mixture was mixed with isocyanate ("Sumidule T-80" available from Sumitomo Bayer Urethane, K.K., Japan), in a proportion of 5.3:1.0, just before the mixture was injected into a mold.

(2) Electrically Conductive Hydrin Rubber Foam Body

The ingredients as indicated below were kneaded by an ordinary enclosed-type mixer, and then mixed together by two rolls with a vulcanizing agent and a foaming agent.

| | |
|---|---|
| epichlorohydrin rubber ("Epichlomer C" available from Daiso K.K., Japan) | 100 parts by weight |
| Carbon ("Seast SO" available from Tokai Carbon Co., Ltd, Japan) | 40 parts by weight |
| precipitated calcium carbonate light | 20 parts by weight |
| processing aid | 3 parts by weight |
| age resistor | 3 parts by weight |
| ethylene thiourea | 1.5 parts by weight |
| N,N'-dinitroso pentamethylene tetramine (foaming agent) ("Celmike A" available from Sankyo Kasei K.K., Japan) | 5 parts by weight |
| urea and its derivatives (foaming aid) ("Celton N" available from Sankyo Kasei K.K., Japan) | 5 parts by weight |

(3) Electrically Conductive Rubber (solid)

The ingredients as indicated below were kneaded by an ordinary enclosed mixer, and then mixed together by two rolls with a vulcanizing agent and a vulcanization accelerator.

| | |
|---|---|
| polynorbornene rubber | 80 parts by weight |
| ethylene-propylene rubber | 20 parts by weight |
| ketjenblack | 40 parts by weight |
| naphthenic oil | 350 parts by weight |

(4) Electrically Conductive EPDM Rubber

The ingredients as indicated below were kneaded by an ordinary enclosed mixer, and then mixed together by two rolls with a vulcanizing agent and a vulcanization accelerator.

| ethylene-propylene rubber | 100 parts by weight |
| --- | --- |
| ketjenblack | 40 parts by weight |
| naphthenic oil | 20 parts by weight |

(5) Electrically Conductive Polyester Elastomer
  "Hytrel 4047X08" available from Toray·du Pont K.K., Japan
(6) Electrically Conductive Polyamide Elastomer
  "Pebax" available from Toray Industries Inc., Japan
(7) Electrically Conductive N-methoxymethylated Nylon
  100 parts by weight of N-methoxymethylated nylon was dissolved in a mixture of methanol and water, and then 15 parts by weight of ketjenblack was added to the solution thus obtained and dispersed by a beads type disperser.
(8) Material for Forming Resistance Adjusting Layer
  The ingredients as indicated below were kneaded or mixed by two rolls, and dissolved in a mixture of methyl ethyl ketone and toluene.

| epichlorohydrin rubber ("Epichlomer C" available from Daiso K.K., Japan) | 100 parts by weight |
| --- | --- |
| hard clay | 40 parts by weight |
| red lead | 5 parts by weight |
| processing aid | 1 parts by weight |
| ethylene thiourea | 1.5 parts by weight |

(9) Material for Forming Protective Layer
  100 parts by weight of N-methoxymethylated nylon was dissolved in a mixture of methanol and water, and then 5 parts by weight of ketjenblack was added to the solution thus obtained and dispersed by a beads type disperser.

Examples 1 through 4 and Comparative Example 1

Five elastic tubes having an outside diameter of 12 mm were formed of the electrically conductive EPDM rubber (4) as indicated above, by using suitable metallic molds, such that the tubes have respective thicknesses as indicated in TABLE 1 below. The surface of each of the thus formed tubes was ground to remove traces of the divided mold, so as to provide a smooth or even surface. Subsequently, a center shaft (core) having a diameter of 6 mm and the above elastic tube were disposed coaxially with each other within a cylindrical metallic mold, and the urethane foam material (1) as indicated above was introduced into a space between the shaft and the tube. Then, the metallic mold was immediately fluid-tightly closed, followed by a foaming operation and heat treatment, so as to form a foam layer and an electrically conductive elastic layer on the outer surface of the shaft.

Subsequently, the material (8) for forming the resistance adjusting layer as indicated above was applied by dipping to the outer surface of the conductive elastic layer to form an 80 μm-thickness layer, and then dried and subjected to heat treatment. Then, the material (9) for forming the protective layer was applied by dipping to the thus formed resistance adjusting layer, to form a 5 μm-thickness layer, and then dried and heat-treated. Thereafter, the axially opposite end portions of the foam layer were impregnated with a liquid including carbon black dispersed in water, and then dried.

Thus, the end portions of the foam layer were made electrically conductive, so as to permit the shaft and the conductive elastic layer to be electrically connected to each other. In this manner, there were obtained five specimens of charging roll constructed as shown in FIG. 2.

The thus obtained charging rolls were tested by measuring the current value, the hardness of the roll, the noise level (sound level), and the surface roughness, and also evaluating the appearance of the roll. Further, the charging rolls were actually installed on printers, and the image producing capability of each of the printers using the respective charging rolls was evaluated. The results of the tests are indicated in TABLE 1 below.

The measurements of the electric current value, roll hardness, sound level, surface roughness and image producing capability of each specimen of charging roll were conducted under the following conditions.

CURRENT VALUE
  Under the environment of 23° C. and 53% RH, each of the charging rolls to be tested was held in pressed contact with a smooth metallic roll having a diameter of 30 mm and rotating at 17 rpm, with a 500 gf load being applied to each of the opposite end portions of the center shaft of the roll. The current value was measured while a voltage of 500Vp-p (300 Hz)–200$V_{DC}$ was applied to the shaft of the charging roll.

ROLL HARDNESS
  The roll hardness was measured by using a SHORE A hardness meter, with a 1 kg load being applied to the charging roll to be tested.

Figure 4:
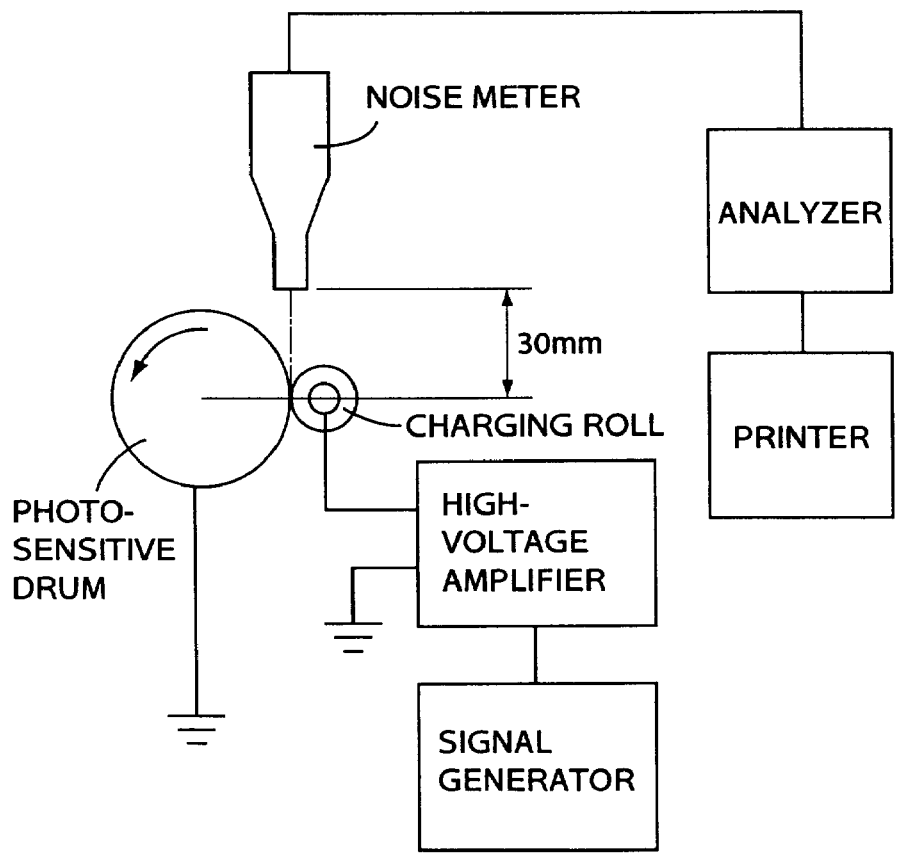
FIG. 4 is a view schematically showing the construction of a device for measuring the sound level of each specimen of charging roll.

SOUND LEVEL
  The sound level was measured by a measuring device constructed as shown in FIG. 4, with a voltage of 2000Vp-p (500 Hz)–550$V_{DC}$ being applied to the shaft of the charging roll to be tested.

SURFACE ROUGHNESS
  The surface roughness was measured by the surface roughness meter named "SURFCOM" manufactured by Tokyo Seimitsu Co., Ltd, Japan.

IMAGE PRODUCING CAPABILITY
  Under the environment of 10° C. and 15% RH, images were continuously printed on 5000 sheets of paper, by using a laser beam printer named "Laser Jet III$_{SI}$" manufactured by HEWLETT PACKARD. The image producing capability was evaluated with respect to each specimen of charging roll, using the following criteria:

○: no variation in the images produced
  Δ: slight variation in the images
  X: variation in the images

TABLE 1

|  |  | Examples | | | | Comparative Example |
| --- | --- | --- | --- | --- | --- | --- |
|  |  | 1 | 2 | 3 | 4 | ample 1 |
| Roll structure | Foam layer | Urethane foam body (electrically conductive opposite end portions) | | | | |
|  | Conductive elastic layer | Electrically conductive EPDM rubber | | | | |
|  | Thickness (μm) | 500 | 800 | 1000 | 1200 | 1400 |
| Current | AC (μA) | 240 | 220 | 205 | 190 | 185 |

TABLE 1-continued

|  | Examples | | | | Comparative Example 1 |
|---|---|---|---|---|---|
|  | 1 | 2 | 3 | 4 |  |
| value DC ($\mu$A) | 125 | 115 | 105 | 90 | 85 |
| Shore A Hardness of Foam layer | 9 | 10 | 9 | 10 | 9 |
| Shore A Hardness of Charging roll | 16 | 18 | 22 | 26 | 35 |
| Noise level (dB) | 60 | 62 | 65 | 69 | 75 |
| Surface roughness (Rz; $\mu$m) | 2.6 | 2.7 | 2.4 | 2.5 | 2.3 |
| Image producing capability | ○ | ○ | ○ | ○ | ○ |
| Appearance of Roll | ○ | ○ | ○ | ○ | ○ |

It will be apparent from the measurement results as indicated in TABLE 1 above that the charging rolls of Examples 1 through 4 made sufficiently small noise and exhibited excellent image producing capability. On the other hand, the charging roll of Comparative Example 1 having a 1400 $\mu$m-thickness conductive elastic layer showed relatively high roll hardness and suffered from relatively large noise.

Examples 5 and 6 and Comparative Example 2

Three elastic tubes made of the electrically conductive polyester elastomer (5) as indicated above were produced by an extruder, such that the tubes had an outside diameter of 12 mm, and respective thicknesses as indicated in TABLE 2 below. These elastic tubes were used to provide three specimens of charging rolls as Examples 5, 6 and Comparative Example 2. Each of the specimens were produced in the same manner as Example 1, wherein the foam layer and electrically conductive elastic layer were formed on the outer surface of the center shaft, and the resistance adjusting layer and protective layer were further formed on the conductive elastic layer. The shaft and the conductive elastic layer were electrically connected to each other in the same manner as in Example 1, so as to provide the intended charging roll as shown in FIG. 2.

The same measurements and evaluation as employed for Example 1 were effected on the charging rolls thus obtained, and the results thereof are indicated in TABLE 2 below. It will be apparent from the results that the charging rolls of Examples 5 and 6 caused significantly reduced noise, and exhibited excellent image producing capability. On the other hand, the charging roll of Comparative Example 2 having a 80 $\mu$m-thickness conductive elastic layer was not able to sufficiently cover and eliminate recesses due to cell defects of the foam layer, and the appearance of the roll was accordingly deteriorated, resulting in increased roughness of the roll surface and poor image producing capability.

TABLE 2

|  |  | Examples | | Comparative Example |
|---|---|---|---|---|
|  |  | 5 | 6 | 2 |
| Roll structure | | | | |
| Foam layer | | Urethane foam body (electrically conductive opposite end portions) | | |
| Conductive elastic layer | | Electrically conductive polyester elastomer | | |
| Thickness ($\mu$m) | | 100 | 300 | 80 |
| Current | AC ($\mu$A) | 250 | 220 | 290 |
| value | DC ($\mu$A) | 130 | 120 | 160 |
| Shore A Hardness of Foam layer | | 9 | 10 | 9 |
| Shore A Hardness of Charging roll | | 15 | 20 | 13 |
| Noise level (dB) | | 58 | 61 | 57 |
| Surface roughness (Rz; $\mu$m) | | 2.2 | 2.8 | 7.2 |
| Image producing capability | | ○ | ○ | Δ |
| Appearance of Roll | | ○ | ○ | X |

Examples 7, 8

Two pre-foam tubes which give respective foam layers were prepared by an extruder, the tubes being formed of the electrically conductive hydrin rubber (2) as indicated above. Similarly, two elastomer tubes were prepared by extrusion, using the electrically conductive polyester elastomer (5) and electrically conductive polyamide elastomer (6) as indicated above, respectively. These elastomer tubes which give respective conductive elastic layers had an outside diameter of 12 mm and the thickness as indicated in TABLE 3 below. Each of the pre-foam conductive hydrin rubber tubes and the corresponding conductive elastomer tube were disposed coaxially with each other within a cylindrical metallic mold, with a 6 mm-diameter center shaft (core) being disposed at the center of the mold. The tubes and shaft in the mold were heated by an oven, to achieve foaming and vulcanization of the tubes, so that the foam body and the conductive elastic layer were formed on the outer surface of the shaft. Further, a resistance adjusting layer and a protective layer were formed by dipping on the outer circumferential surface of each conductive elastic layer, in the same manner as Example 1, so as to provide two specimens (Examples 7, 8) of charging rolls as shown in FIG. 1.

The same measurements and evaluation as employed for Example 1 were effected on the charging rolls thus obtained, and the results thereof are indicated in TABLE 3 below. It will be apparent from the results that the charging rolls of Examples 7 and 8 caused comparatively small noise, and exhibited excellent image producing capability.

TABLE 3

| | Examples | |
|---|---|---|
| | 7 | 8 |
| Roll structure | | |
| Foam layer | Electrically conductive hydrin rubber foam body | |
| Conductive elastic layer | Conductive polyester elastomer | Conductive polyamide elastomer |
| Thickness (μm) | 300 | 300 |
| Current value AC (μA) | 215 | 220 |
| Current value DC (μA) | 115 | 115 |
| Shore A Hardness of Foam layer | 11 | 11 |
| Shore A Hardness of Charging roll | 20 | 27 |
| Noise level (dB) | 62 | 63 |
| Surface roughness (Rz; μm) | 2.1 | 2.4 |
| Image producing capability | ◯ | ◯ |
| Appearance of Roll | ◯ | ◯ |

TABLE 4

| | | Comparative Example | | | |
|---|---|---|---|---|---|
| | | 3 | 4 | 5 | 6 |
| Roll structure | | | | | |
| Conductive rubber layer | | Electrically conductive hydrin rubber foam body | | | Conductive solid rubber |
| Conductive resin layer | | Electrically conductive N-methoxymethylated nylon | | | |
| Thickness (μm) | | 10 | 10 | 10 | 10 |
| Current value | AC (μA) | 680 | 650 | 500 | 300 |
| Current value | DC (μA) | 670 | 630 | 470 | 190 |
| Shore A Hardness of Foam layer | | 10 | 13 | 18 | — |
| Shore A Hardness of Charging roll | | 11 | 14 | 19 | 36 |
| Noise level (dB) | | 62 | 66 | 73 | 78 |
| Surface roughness (Rz; μm) | | 50 | 21 | 8 | 3.1 |
| Image producing capability | | X | Δ | ◯ | ◯ |
| Appearance of Roll | | X | Δ | ◯ | ◯ |

Comparative Examples 3, 4 and 5

Three pre-foam tubes were initially prepared by an extruder, using the electrically conductive hydrin rubber (2) as indicated above. Each of the pre-foam tubes and a 6 mm-diameter center shaft (core) were disposed coaxially with each other within a cylindrical metallic mold, and heated by an oven, to achieve foaming and vulcanization of the tube, so that a foam layer having a thickness of 3 mm was formed on the outer surface of the shaft. Thus, three specimens of charging rolls were produced as Comparative Examples 3, 4 and 5 in which the respective foam layers had different expansion ratios. To prevent the foam layer of each charging roll from being swollen by a solvent of a resistance adjusting layer to be formed, the foam layer was coated by dipping with a 10 μm-thickness layer of the electrically conductive N-methoxymethylated nylon (7) as indicated above, which was then dried and heat-treated. Further, the resistance adjusting layer and a protective layer were formed by dipping on the above coating layer, in the same manner as Example 1, so as to provide the intended charging roll.

The same measurements and evaluation as employed for Example 1 were conducted on the charging rolls thus obtained, and the results thereof are indicated in TABLE 4 below. In Comparative Examples 3 and 4, the expansion ratio of the foam layer was made relatively high so as to reduce the hardness of the charging roll. In this case, the noise can be effectively reduced, but the appearance of the roll is deteriorated with creases appearing on the coating layer due to shrinking thereof, resulting in increased roughness of the roll surface and poor image producing capability. In Comparative Example 5, the expansion ratio of the foam layer was made relatively low so as to avoid the creases of the coating layer. In this case, however, the roll has a relatively high hardness and the noise made by the roll is undesirably increased.

Comparative Example 6

A 6 mm-thickness center shaft (core) and the electrically conductive rubber (solid) (3) as indicated above were disposed in a metallic mold, and were heated by press, so that a 3 mm-thickness conductive rubber layer was formed on the outer circumferential surface of the shaft. Then, the surface of the conductive rubber layer was made smooth by grinding, and was coated by dipping with a 10 μm-thickness layer of the electrically conductive N-methoxymethylated nylon (7) as indicated above, which was then dried and heat-treated. Then, a resistance adjusting layer and a protective layer were further formed by dipping on the coating layer, in the same manner as Example 1, so as to provide an intended charging roll as Comparative Example 6.

The same measurements and evaluation as employed for Example 1 were effected on the thus obtained charging roll, and the results thereof are indicated in TABLE 4 above. It will be understood from the results that the Shore A hardness of the charging roll was increased to as high as 64 and the roll made a comparatively large noise.

Examples 9, 10 and 11 and Comparative Example 7

Initially, hydrin rubber having a composition as indicated below was prepared, and pre-foam tubes having an inside diameter of 7.5 mm and an outside diameter of 10 mm were produced by extruding the thus prepared hydrin rubber through grooved extrusion dies, so that a multiplicity of minute grooves were formed in the outer circumferential surface of each pre-foam tube, in the axial direction of the tube. The number and depth of the grooves formed in the pre-foam tube are indicated in TABLE 5 below.

| Composition of Hydrin Rubber | |
| --- | --- |
| hydrin rubber | 100 parts by weight |
| carbon black | 40 parts by weight |
| softening agent | 10 parts by weight |
| vulcanizing agent | 1.5 parts by weight |
| foaming agent | 5 parts by weight |
| foaming aid | 5 parts by weight |

By using EPDM (ethylene-propylene copolymer rubber) or polyamide elastomer each having a composition as indicated below, elastic tubes having an inside diameter of 11.4 mm and an outside diameter of 11.8 mm were formed by extrusion.

| Composition of EPDM | |
| --- | --- |
| EPDM | 100 parts by weight |
| ZnO | 5 parts by weight |
| stearic acid | 1 part by weight |
| processed oil | 30 parts by weight |
| electrically conductive carbon | 33 parts by weight |
| peroxide | 3.5 parts by weight |
| cross linking agent | 3 parts by weight |

| Composition of Polyamide Elastomer | |
| --- | --- |
| polyamide elastomer (available from Toray Industries Inc., Japan Trade name: Pebax) | 100 parts by weight |
| electrically conductive carbon | 30 parts by weight |

A cylindrical metallic mold having an inside diameter of 12 mm was prepared, and a 6 mm-diameter shaft (core) was disposed at the center of a cavity of the mold. Then, the pre-foam tube and elastic tube of each specimen were disposed coaxially with each other, and the opposite axial ends of the metallic mold were closed by respective cap members. Thereafter, the cylindrical metallic mold was put into an oven, and the pre-foam and elastic tubes were heated at 160° C. for 40 minutes, so as to foam the pre-foam tube. In this manner, three examples (Examples 9, 10 and 11) of composite rolls each having a foam layer formed integrally with a solid elastic layer were prepared. As Comparative Example 7, there was prepared a composite roll formed from a pre-foam tube having no grooves, and the elastic tube as described above.

Each of the thus obtained composite rolls was measured by a surface roughness meter, and the surface smoothness of each roll was evaluated. The result of the evaluation is indicated in TABLE 5 below, wherein "○" indicates that no recess appeared on the roll, and, "Δ" indicates that recesses having a depth less than 10 μm appeared on the roll, while "X" indicates that recesses having a depth of 10 μm or larger appeared on the roll.

The solid elastic layer of each specimen was peeled off from the composite roll, and the surface of the foam layer was observed by human naked eyes to evaluate the condition of the surface. The result of the evaluation is indicated in TABLE 5 below, wherein "○" indicates that no voids appeared on the surface of the foam layer, and "Δ" indicates that relatively small voids (having a diameter of less than 2 mm) appeared on the surface, while "X" indicates that relatively large voids (having a diameter of 2 mm or larger) appeared on the surface.

TABLE 5

| | Example | | | Comparative |
| --- | --- | --- | --- | --- |
| | 9 | 10 | 11 | Example 7 |
| Pre-foam tube Material | hydrin rubber | | | hydrin rubber |
| Grooves number | 45 | 45 | 35 | 0 |
| depth (mm) | 0.8 | 0.4 | 0.4 | — |
| depth/pitch | 0.96 | 0.48 | 0.37 | — |
| Elastic tube Material | EPDM | | polyamide elastomer | |
| Smoothness of roll surface | ○ | ○ | Δ | X |
| Surface condition of foam layer | ○ | ○ | Δ | X |

It will be understood from the above results that the composite rolls of Examples 9–11 having multiple minute grooves formed in the outer surface of the pre-foam tube were free from voids on the surface of the foam layer of each roll. On the other hand, voids appeared in the composite roll of Comparative Example 7, and adversely affected the surface smoothness of the roll.

Examples 12–17 and Comparative Examples 8–11

Initially, hydrin rubber having a composition as indicated below was prepared, and pre-foam tubes having an inside diameter of 8 mm and an outside diameter of 10 mm were produced by extrusion.

| Composition of Hydrin Rubber | |
| --- | --- |
| hydrin rubber | 100 parts by weight |
| carbon black | 40 Parts by weight |
| softening agent | 10 parts by weight |
| vulcanizing agent | 1.5 parts by weight |
| foaming agent | 5 parts by weight |
| foaming aid | 5 parts by weight |

By using polyamide elastomer having a composition as indicated below, elastic tubes each having an inside diameter of 11.4 mm and an outside diameter of 11.8 mm were formed by extrusion. For composite rolls of Examples 16 and 17, a grooved extrusion spindle was used for extruding each of the elastic tubes, so that minute grooves were formed in the inner circumferential surface of the elastic tube, and so that the inner circumferential surface had a surface roughness (Rz) as indicated in TABLE 6 below. For composite rolls of Examples 12–15 and Comparative Examples 9–11, the inner circumferential surface of each of the elastic tubes was ground with various kinds of sand paper, in the axial direction of the tube, after extrusion of these elastic tubes. Thus, the inner circumferential surface of the relevant elastic tube was formed with minute grooves, to provide a surface roughness (Rz) as indicated in TABLE 6 below.

| Composition of Polyamide Elastomer | |
| --- | --- |
| polyamide elastomer (available from Toray Industries, Ltd., Japan Trade name: Pebax) | 100 parts by weight |
| electrically conductive carbon | 30 parts by weight |

A cylindrical metallic mold having an inside diameter of 12 mm was prepared, and a 6 mm-diameter shaft (core) was disposed at the center of a cavity of the mold. Then, the pre-foam tube and elastic tube of each example were disposed coaxially with each other, and the opposite axial ends of the metallic mold were closed by respective cap members.

Thereafter, the cylindrical metallic mold was put into an oven, and the pre-foam and elastic tubes were heated at 160° C. for 40 minutes, so as to foam the pre-foam tube. In this manner, ten specimens of composite rolls each having a foam layer formed integrally with a solid elastic layer were prepared. As Comparative Example 8, there was prepared a composite roll formed from the pre-foam tube as described above, and an elastic tube having no grooves.

Each of the thus obtained composite rolls was measured by a surface roughness meter, and the surface smoothness of each specimen was evaluated. The result of the evaluation is indicated in TABLE 6 below, wherein, "○" indicates that no recess appeared on the roll, and "Δ" indicates that recesses having a depth less than 10 μm appeared on the roll, while "X" indicates that recesses having a depth of 10 μm or larger appeared on the roll.

The solid elastic layer of each specimen was peeled off from the composite roll, and the surface of the foam layer was observed by human naked eyes to evaluate the condition of the surface. The result of the evaluation is indicated in TABLE 6 below, wherein "○" indicates that no voids appeared on the surface of the foam layer, and "Δ" indicates that relatively small voids (having a diameter of less than 2 mm) appeared on the surface, while, "X" indicates that relatively large voids (having a diameter of 2 mm or larger) appeared on the surface.

It will be understood from TABLE 6 that the composite rolls of Examples 12–17 in which the minute grooves were formed in the inner surface of the elastic tube to provide the surface roughness of not less than 15 μm were free from voids and exhibited significantly improved surface smoothness. On the other hand, the composite roll of Comparative Example 8 having no grooves in the elastic tube and the composite rolls of Comparative Examples 9–11 in which the surface roughness of the inner circumferential surface of the elastic tube was less than 15 μm suffered from voids, due to air trapped between the foam layer and solid elastic layer, and exhibited poor surface smoothness.

TABLE 6

| | Examples | | | | | | Comparative Examples | | | |
| --- | --- | --- | --- | --- | --- | --- | --- | --- | --- | --- |
| | 12 | 13 | 14 | 15 | 16 | 17 | 8 | 9 | 10 | 11 |
| Elastic tube Processing on inner surface | #320 | #120 Grinding with Sandpaper | #60 | #60 | Grooving upon extrusion of tube | | None | #1000 Grinding with Sandpaper | #800 | #800 |
| Surface roughness (Rz; μm) | 15 | 20 | 25 | 30 | 25 | 30 | 2 | 5 | 8 | 10 |
| Smoothness of roll surface | ○ | ○ | ○ | ○ | ○ | ○ | X | X | Δ | Δ |
| Surface condition of foam layer | ○ | ○ | ○ | ○ | ○ | ○ | X | Δ | Δ | ○ |

What is claimed is:

1. A charging roll comprising:

a center shaft;

a foam layer formed on an outer circumferential surface of said center shaft, said foam layer consisting of an electrically conductive foam body or a foam body a part of which is made electrically conductive;

an electrically conductive elastic layer formed on an outer surface of said foam layer, said electrically conductive elastic layer having a thickness of 100 μm~1200 μm, and comprising one of an electrically conductive rubber composition and an electrically conductive thermoplastic elastomer;

a resistance adjusting layer formed by coating on an outer surface of said electrically conductive elastic layer; and a protective layer formed by coating on an outer surface of said resistance adjusting layer.

2. A charging roll according to claim 1, wherein said foam layer consists of an electrically conductive foam material containing an electrically conductive powder or fiber.

3. A charging roll according to claim 2, wherein said electrically conductive powder or fiber is selected from the group consisting of a metal powder, carbon black and carbon fiber.

4. A charging roll according to claim 1, wherein said foam layer includes at least one electrically conductive portion through which said center shaft is electrically connected to said electrically conductive elastic layer.

5. A charging roll according to claim 4, wherein said foam layer has axially opposite end portions as said at least one electrically conductive portion.

6. A charging roll according to claim 1, wherein said foam layer has a Shore A hardness of not greater than 15.

7. A charging roll according to claim 1, further comprising an electrically conductive resin layer formed by coating on said electrically conductive elastic layer.

8. A charging roll according to claim 1, wherein said resistance adjusting layer has a thickness of 50 $\mu$m to 500 $\mu$m.

* * * * *